(12) United States Patent
Budagavi et al.

(10) Patent No.: US 12,425,619 B2
(45) Date of Patent: *Sep. 23, 2025

(54) CABAC DECODER WITH DECOUPLED ARITHMETIC DECODING AND INVERSE BINARIZATION

(71) Applicant: Texas Instruments Incorporated, Dallas, TX (US)

(72) Inventors: Madhukar Budagavi, Plano, TX (US); Mehmet Umut Demircin, Kecioren (TR)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/531,944

(22) Filed: Dec. 7, 2023

(65) Prior Publication Data

US 2024/0107042 A1 Mar. 28, 2024

Related U.S. Application Data

(63) Continuation of application No. 17/988,265, filed on Nov. 16, 2022, now Pat. No. 11,843,794, which is a
(Continued)

(51) Int. Cl.
*H04N 19/70* (2014.01)
*H04N 19/436* (2014.01)
(Continued)

(52) U.S. Cl.
CPC .......... *H04N 19/436* (2014.11); *H04N 19/44* (2014.11); *H04N 19/61* (2014.11); *H04N 19/70* (2014.11); *H04N 19/91* (2014.11)

(58) Field of Classification Search
CPC ...... H04N 19/436; H04N 19/44; H04N 19/61; H04N 19/70; H04N 19/91
See application file for complete search history.

(56) References Cited

U.S. PATENT DOCUMENTS 5,903,311 A 5/1999 Ozcelik et al.
8,498,342 B1 7/2013 Sha
(Continued)

OTHER PUBLICATIONS

TU-T Telecommunication Standardization Sector of ITU, "Series H: Audiovisual and Multimedia Systems, Infrastructure of Audiovisual Services—Coding of Moving Video; Advanced Video Coding for Generic Audiovisual Services", ITU-T Recommendation H.264, Mar. 2005, pp. 1-343.
(Continued)

*Primary Examiner* — Tat C Chio
(74) *Attorney, Agent, or Firm* — Carl G. Peterson; Frank D. Cimino

(57) ABSTRACT

An encoded bitstream of entropy encoded video data is received by a video decoder. The encoded bitstream represents syntax elements of a sequence of coding blocks. The sequence of coding blocks is recovered by processing a bin sequences associated with each coding block in a processing pipeline, wherein a defined amount of time is allocated to process each coding block in the processing pipeline. The encoded bitstream is arithmetically decoded to produce each bin sequence. The arithmetic decoder is time-wise decoupled from the processing pipeline by storing a plurality of the bin sequences in a buffer memory.

20 Claims, 10 Drawing Sheets

Related U.S. Application Data continuation of application No. 17/163,749, filed on Feb. 1, 2021, now Pat. No. 11,546,620, which is a continuation of application No. 15/979,141, filed on May 14, 2018, now Pat. No. 10,944,979, which is a continuation of application No. 13/039,078, filed on Mar. 2, 2011, now Pat. No. 9,973,768.

(60) Provisional application No. 61/314,419, filed on Mar. 16, 2010.

(51) Int. Cl.
  *H04N 19/44* (2014.01)
  *H04N 19/61* (2014.01)
  *H04N 19/91* (2014.01)

(56) References Cited

U.S. PATENT DOCUMENTS

| | | | | |
|---|---|---|---|---|
| 9,973,768 | B2* | 5/2018 | Budagavi | H04N 19/91 |
| 10,944,979 | B2* | 3/2021 | Budagavi | H04N 19/61 |
| 11,546,620 | B2* | 1/2023 | Budagavi | H04N 19/44 |
| 2004/0240743 | A1 | 12/2004 | Hamada et al. | |
| 2005/0179572 | A1 | 8/2005 | Winger | |
| 2005/0259753 | A1 | 11/2005 | Zhu | |
| 2005/0265449 | A1* | 12/2005 | Yoon | H04N 21/236 |
| | | | | 375/E7.199 |
| 2006/0023795 | A1 | 2/2006 | Kim | |
| 2006/0126744 | A1 | 6/2006 | Peng et al. | |
| 2006/0294174 | A1 | 12/2006 | Haque et al. | |
| 2007/0040708 | A1 | 2/2007 | Senda | |
| 2007/0058725 | A1 | 3/2007 | Iguchi | |
| 2007/0071332 | A1 | 3/2007 | Katayama | |
| 2007/0183491 | A1 | 8/2007 | Pearson | |
| 2009/0168868 | A1 | 7/2009 | Jahanghir | |
| 2009/0304075 | A1 | 12/2009 | Ogura et al. | |
| 2010/0097250 | A1 | 4/2010 | Demircin et al. | |
| 2010/0098155 | A1 | 4/2010 | Demircin et al. | |
| 2011/0292995 | A1 | 12/2011 | Kubota | |

OTHER PUBLICATIONS

Detlev Marpe, et al., "Context-Based Adaptive Binary Arithmetic Coding in the H.264/AVC Video Compression Standard," IEEE Transactions on Circuits and Systems for Video Technology, vol. 13, No. 7, pp. 620-636, Jul. 2003 (17 pages).

* cited by examiner

- Example: 4-symbol alphabet
  - Pr(A)=0.6
  - Pr(B)=0.2
  - Pr(C)=0.1
  - Pr(D)=0.1

Entropy Encoding Symbol Sequence: "A-C-D"

CABAC DECODER WITH DECOUPLED ARITHMETIC DECODING AND INVERSE BINARIZATION

CROSS-REFERENCE TO RELATED APPLICATIONS

This application is a continuation of U.S. patent application Ser. No. 17/988,265, filed Nov. 16, 2022, currently pending and scheduled to grant as U.S. Pat. No. 11,843,794 on Dec. 12, 2023, which is a continuation of U.S. patent application Ser. No. 17/163,749, filed Feb. 1, 2021 (now U.S. Pat. No. 11,546,520), which is a continuation of U.S. patent application Ser. No. 15/979,141, filed May 14, 2018 (now U.S. Pat. No. 10,944,979), which is a continuation of U.S. patent application Ser. No. 13/039,078, filed Mar. 2, 2011 (now U.S. Pat. No. 9,973,768), which claims the benefit of U.S. Provisional Patent Application No. 61/314,419, entitled "Reduced Memory Decoupled H.264 CABAC Decoder Implementation: Decoupling Arithmetic Decoding and Inverse Binarization," filed Mar. 16, 2010, all of which are incorporated by reference herein in their entirety.

BACKGROUND OF THE INVENTION

The demand for digital video products continues to increase. Some examples of applications for digital video include video communication, security and surveillance, industrial automation, and entertainment (e.g., DV, HDTV, satellite TV, set-top boxes, Internet video streaming, digital cameras, cellular telephones, video jukeboxes, high-end displays, and personal video recorders). Further, video applications are becoming increasingly mobile as a result of higher computation power in handsets, advances in battery technology, and high-speed wireless connectivity.

Video compression and decompression is an essential enabler for digital video products. Compression-decompression (CODEC) algorithms enable storage and transmission of digital video. Typically codecs use industry standards such as MPEG-2, MPEG-4, H.264/AVC, etc. At the core of all of these standards is the hybrid video coding technique of block motion compensation (prediction) plus transform coding of prediction error. Block motion compensation is used to remove temporal redundancy between successive pictures (frames or fields) by prediction from prior pictures, whereas transform coding is used to remove spatial redundancy within each block.

Many block motion compensation schemes basically assume that between successive pictures, i.e., frames, in a video sequence, an object in a scene undergoes a displacement in the x- and y-directions and these displacements define the components of a motion vector. Thus, an object in one picture can be predicted from the object in a prior picture by using the motion vector of the object. To track visual differences from frame-to-frame, each frame is tiled into blocks often referred to as coding blocks, or macroblocks. Block-based motion estimation algorithms are used to generate a set of vectors to describe block motion flow between frames, thereby constructing a motion-compensated prediction of a frame. The vectors are determined using block-matching procedures that try to identify the most similar blocks in the current frame with those that have already been encoded in prior frames.

Context-adaptive binary arithmetic coding (CABAC) is a form of entropy coding used in H.264/MPEG-4 AVC video encoding. As such, it is an inherently lossless compression technique. It is notable for providing considerably better compression than most other encoding algorithms used in video encoding and is considered one of the primary advantages of the H.264/AVC encoding scheme. CABAC is only supported in Main and higher profiles and requires a considerable amount of processing to decode compared to other similar algorithms. As a result, Context-adaptive variable-length coding (CAVLC), a lower efficiency entropy encoding scheme, is sometimes used instead to increase performance on slower playback devices. CABAC achieves 9%-14% better compression compared to CAVLC, with the cost of increased complexity.

The theory and operation of CABAC encoding for H.264 is fully defined in the International Telecommunication Union, Telecommunication Standardization Sector (ITU-T) standard "Advanced video coding for generic audiovisual services" H.264, revision 03/2005 or later. General principles are explained in detail in "Context-Based Adaptive Binary Arithmetic Coding in the H.264/AVC Video Compression Standard" Detlev Marpe, July 2003. In brief, CABAC has multiple probability modes for different contexts. It first converts all non-binary symbols to binary. Then, for each bit, the coder selects which probability model to use, and uses information from nearby elements to optimize the probability estimate. Arithmetic coding is then applied to compress the data.

BRIEF DESCRIPTION OF THE DRAWINGS

Particular embodiments in accordance with the invention will now be described, by way of example only, and with reference to the accompanying drawings.

DETAILED DESCRIPTION OF EMBODIMENTS OF THE INVENTION

Figure 1:
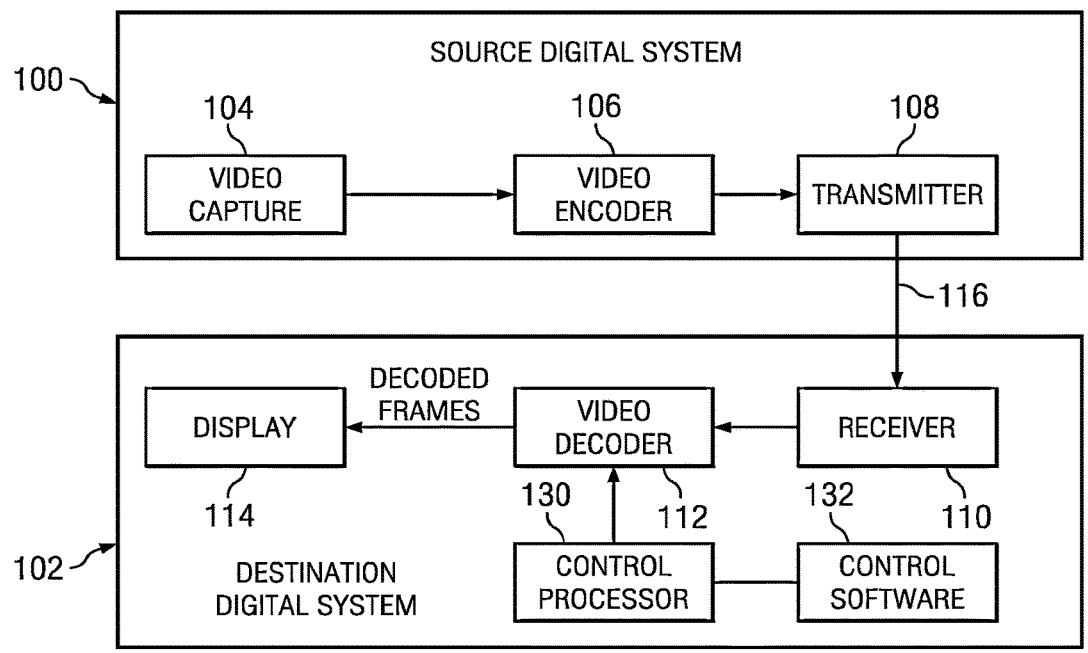
FIG. 1 shows a block diagram of a digital system in accordance with one or more embodiments of the invention.

Specific embodiments of the invention will now be described in detail with reference to the accompanying figures. Like elements in the various figures are denoted by like reference numerals for consistency. Certain terms are used throughout the following description and the claims to refer to particular system components. As one skilled in the art will appreciate, components in digital systems may be referred to by different names and/or may be combined in ways not shown herein without departing from the described functionality. This document does not intend to distinguish between components that differ in name but not function.

Hardware H.264 decoders with pipelined architecture should decode a coding block (CB) in an allotted time budget for real-time operation. A context adaptive binary arithmetic coding (CABAC) decoding engine should also comply with the CB time (or cycle) budget if it is implemented in the CB decoding pipeline. CABAC decoding time for a coding block is variable depending on the number of binary symbols (bins) in the CB bitstream. When the number of CB bins exceeds the allowable budget, the CABAC engine in a strict pipeline may need to hold the pipeline while the CABAC engine completes processing, causing loss of cycles in the pipeline.

This CB decoding pipeline problem may be mitigated by decoupling the CABAC engine from the main video decoding pipeline in order to make use of load averaging over multiple CBs. When the CABAC decoding engine is executed outside the main video decoding pipeline, its output needs to be buffered in a memory module coupled to the CABAC engine. The size of the required memory gets larger depending on how much earlier the CABAC engine begins processing a coding block before the rest of the CB decoding pipeline begins processing the same coding block. Embodiments of the present invention provide a method to reduce the memory size and memory access bandwidth requirements of the H.264 CABAC decoder when it is executed outside the main video decoding pipeline.

CABAC has multiple probability modes for different contexts. It first converts all non-binary symbols to binary. Then, for each bit, the coder selects which probability model to use, and uses information from nearby elements to optimize the probability estimate. Arithmetic coding is then applied to compress the data. Efficient coding of syntax-element values in a hybrid block-based video coder, such as components of motion vector differences or transform-coefficient level values, can be achieved by employing a binarization scheme as a kind of preprocessing unit for the subsequent stages of context modeling and binary arithmetic coding. In general, a binarization scheme defines a unique mapping of syntax element values to sequences of binary decisions, so-called bins, which can also be interpreted in terms of a binary code tree. The sequence of binary decisions may be referred to as a bin string, or other similar terms.

By decomposing each syntax element value into a sequence of bins, further processing of each bin value in CABAC depends on the associated coding-mode decision which can be either the regular or the bypass mode. Bypass mode is typically used for bins that are assumed to be uniformly distributed. In the regular coding mode, each bin value is encoded by using the regular binary arithmetic-coding engine, where the associated probability model is either determined by a fixed choice, without any context modeling, or adaptively chosen depending on a related context model. In H.264, context models may be identified using a context index that is selected from 460 possible values (except High 4:4:4 Intra and High 4:4:4 Predictive profiles).

For bypass mode, complexity of the arithmetic coding is significantly reduced. For regular arithmetic coding, encoding of the given bin value depends on the actual state of the associated adaptive probability model that is passed along with the bin value to the multiplication-free Modulo (M) coder, which is a table-based binary arithmetic coding engine used in CABAC. Probability estimation in CABAC is based on a table-driven estimator in which each probability model can take one of 64 different states with associated probability values p ranging in the interval 0.0-0.5 The distinction between the least probable symbol (LPS) and the most probable symbol (MPS) allows each state to be specified by means of the corresponding LPS-related probability, pLPS, and the MPS.

FIG. 1 shows a block diagram of a digital system in accordance with one or more embodiments of the invention. The system includes a source digital system (100) that transmits encoded video sequences to a destination digital system (102) via a communication channel (116). The source digital system (100) includes a video capture component (104), a video encoder component (106) and a transmitter component (108). The video capture component (104) is configured to provide a video sequence to be encoded by the video encoder component (106). The video capture component (104) may be for example, a video camera, a video archive, or a video feed from a video content provider. In some embodiments of the invention, the video capture component (104) may generate computer graphics as the video sequence, or a combination of live video and computer-generated video.

The video encoder component (106) receives a video sequence from the video capture component (104) and encodes it for transmission by the transmitter component (1108). In general, the video encoder component (106) receives the video sequence from the video capture component (104) as a sequence of frames, divides the frames into coding units which may be a whole frame or a part of a frame, divides the coding units into blocks of pixels, and encodes the video data in the coding units based on these blocks. The functionality of one or more embodiments of the video encoder component (106) is described in more detail below in reference to FIG. 9.

The transmitter component (108) transmits the encoded video data to the destination digital system (102) via the communication channel (116). The communication channel (116) may be any communication medium, or combination of communication media suitable for transmission of the encoded video sequence, such as, for example, wired or wireless communication media, a local area network, or a wide area network.

The destination digital system (102) includes a receiver component (110), a video decoder component (112) and a display component (114). The receiver component (110) receives the encoded video data from the source digital system (100) via the communication channel (116) and provides the encoded video data to the video decoder component (112) for decoding. In general, the video decoder component (112) reverses the encoding process performed by the video encoder component (106) to reconstruct the frames of the video sequence. One or more control processors 130 are coupled to memory that holds control software 132. Control processor 130 is coupled to video decoder 112 and controls its operation using control software 132. The functionality of one or more embodiments of the video decoder component (112) is described in more detail below with reference to FIGS. 3-8.

The reconstructed video sequence may then be displayed on the display component (114). The display component (114) may be any suitable display device such as, for example, a plasma display, a liquid crystal display (LCD), a light emitting diode (LED) display, etc.

In some embodiments of the invention, the source digital system (100) may also include a receiver component and a video decoder component and/or the destination digital system (102) may include a transmitter component and a video encoder component for transmission of video sequences both directions for video steaming, video broadcasting, and video telephony.

The video encoder component (106) and the video decoder component (112) may perform encoding and decoding in accordance with one or more video compression standards such as, for example, the Moving Picture Experts Group (MPEG) video compression standards, e.g., MPEG-1, MPEG-2, and MPEG-4, the ITU-T video compression standards, e.g., H.263, H.264, and HEVC, the Society of Motion Picture and Television Engineers (SMPTE) 421 M video CODEC standard (commonly referred to as "VC-1"), the video compression standard defined by the Audio Video Coding Standard Workgroup of China (commonly referred to as "AVS"), etc. The video encoder component (106) and the video decoder component (112) may be implemented in any suitable combination of software, firmware, and hardware, such as, for example, one or more digital signal processors (DSPs), microprocessors, discrete logic, application specific integrated circuits (ASICs), field-programmable gate arrays (FPGAs), etc.

Figure 2:
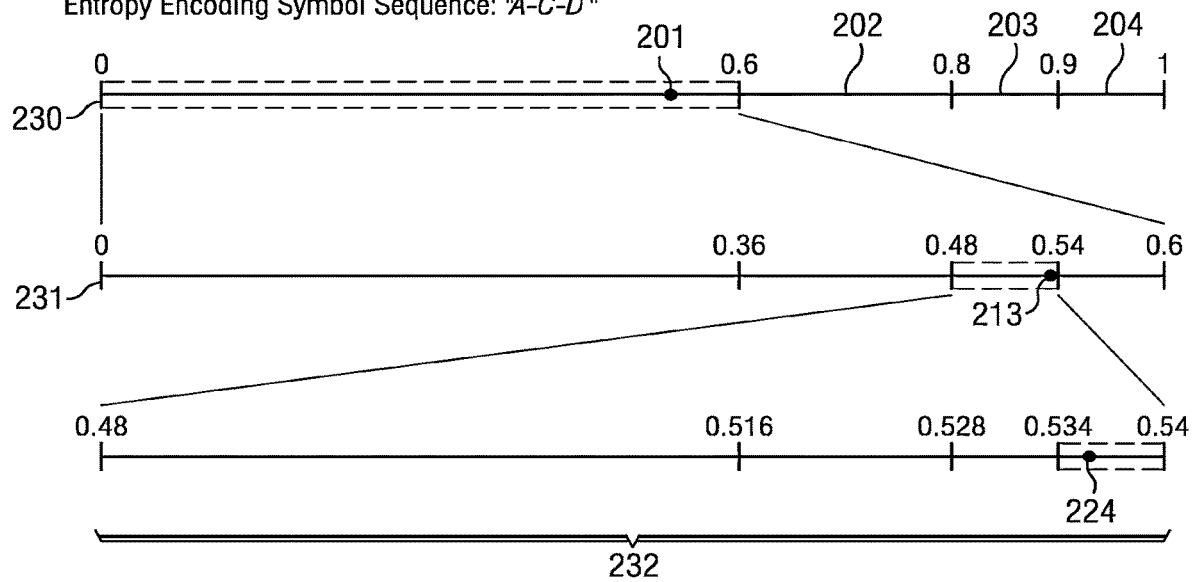
FIG. 2 illustrates the operation of entropy coding by the encoder of FIG. 1.

In order to better understand the process of arithmetic encoding and bin decoding, FIG. 2 is an illustration of encoding a sequence "A-C-D" of an exemplary 4-symbol alphabet. In this example, symbol A has a probability of occurrence of 0.6, B has a probability of occurrence of 0.2, and symbol C and D both have a probability of occurrence of 0.1. Initially, range 230 extends from 0.0 to 1.0 and with all four symbols 201-203 mapped onto the total range of 0.0-1.0. Thus, by transmitting any value between 0.0 and 0.6 as indicated at 201, and knowing the range is 0.0-1.0, a decoder could determine that symbol "A" was transmitted, for example. In order to encode the sequence "A-C-D", the probabilities are effectively multiplied together. In this case, since the first symbol is A 201, its probability 0.6 is expanded (normalized) to full range 231 and the symbol alphabet is again mapped onto the normalized range 231. The CC" position 213 now covers a portion 0.48-0.54 of range 231 that has a value of 0.0-0.6. This range is normalized at 232 and the symbol alphabet is again mapped by effectively multiplying the individual probabilities. Symbol "D" occupies a portion 0.534-0.54 of range 232 that has a value of 0.48-0.54. Thus, any value between 0.534-0.54 within this range can be transmitted and the decoder can recover the original sequence by reversing the process and sequentially renormalizing the range as each symbol is determined.

This process can be extended for dozens or thousands of symbols. As long as the decoder knows the final range, the probabilities of the symbols and a value within the range, the decoder can incrementally reverse the process to recover the entire sequence of symbols.

Figure 3:
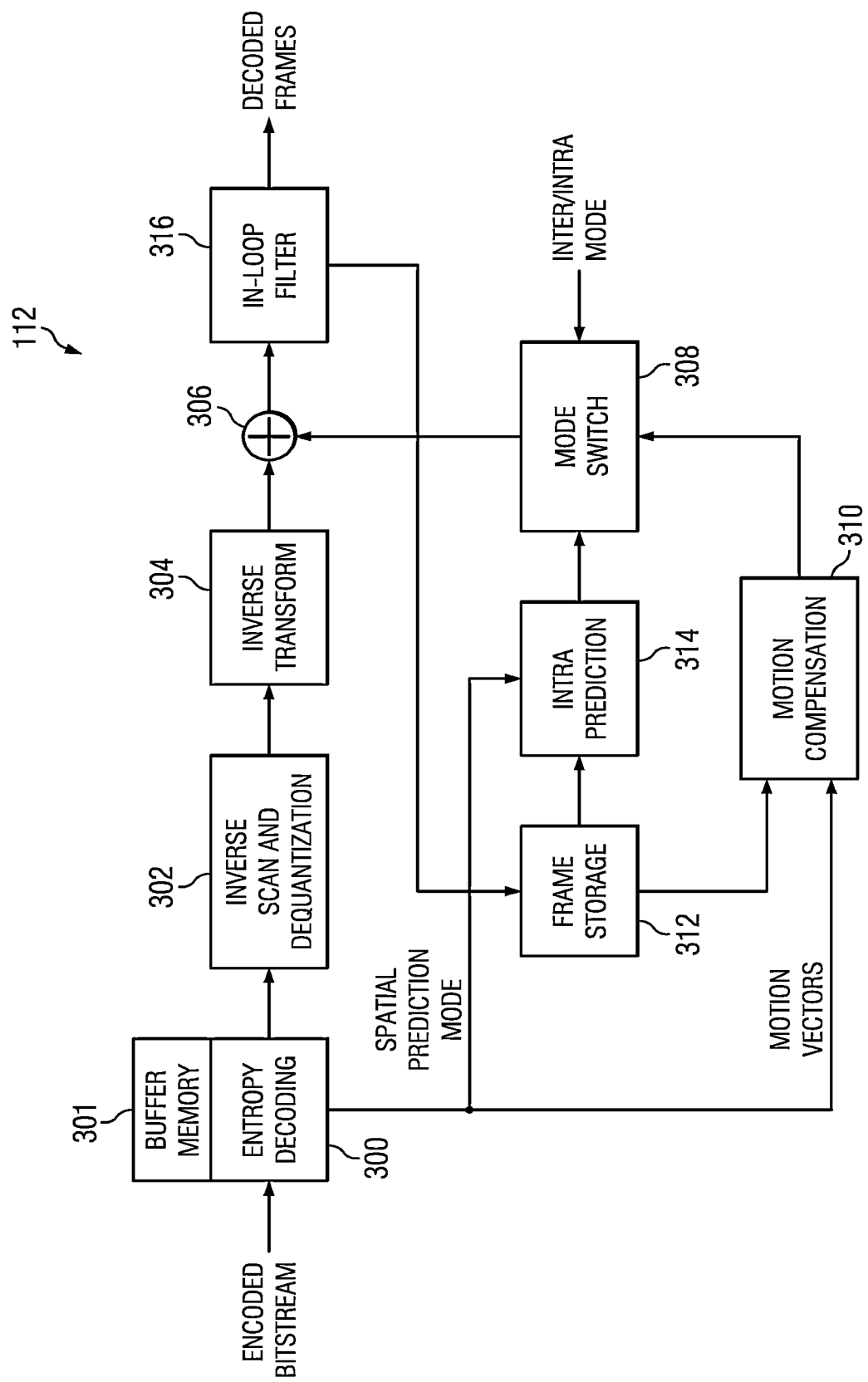
FIG. 3 shows a block diagram of a video decoder in accordance with one or more embodiments of the invention.

FIG. 3 shows a block diagram of a video decoder, e.g., the video decoder (112), in accordance with one or more embodiments of the invention. In the video decoder of FIG. 3, the entropy decoding component 300 receives an entropy encoded video bit stream and reverses the entropy encoding to recover the encoded coding blocks. In this embodiment, the entropy decoding performed by the entropy decoder component (300) is context adaptive binary arithmetic decoding (CABAC). Entropy decoder 300 is decoupled from the rest of the decoding pipeline by using buffer memory 301 to allow load averaging over multiple CB s. Operation of entropy decoder 300 will be described in more detail below.

The inverse scan and dequantization component (302) assembles the coding blocks in the video bit stream in raster scan order and substantially recovers the original frequency domain data, i.e., de-quantized residual coefficients. The inverse transform component (304) transforms the frequency domain data from inverse scan and dequantization component (302) back to a residual prediction block. That is, the inverse transform component (304) applies an inverse block transform, i.e., the inverse of the block transform used for encoding, to the de-quantized residual coefficients to produce the residual prediction block.

This residual prediction block supplies one input of the addition component (306). The other input of the addition component (306) comes from the mode switch (308). When inter-prediction mode is signaled in the encoded video stream, the mode switch (308) selects a prediction block from the motion compensation component (310) and when intra-prediction is signaled, the mode switch selects a prediction block from the intra prediction component (314). The motion compensation component (310) receives reference frame data from a frame storage component (312) and applies the motion compensation computed by the encoder and transmitted in the encoded video bit stream to the reference frame data to generate a prediction block.

The intra-prediction component (314) receives previously decoded prediction blocks from the current frame and applies the intra-prediction computed by the encoder as signaled by a spatial prediction mode transmitted in the encoded video bit stream to the previously decoded prediction blocks to generate a prediction block.

The addition component (306) recovers the predicted prediction block, i.e., generates a decoded prediction block, by adding the selected prediction block and the residual prediction block. The output of the addition component (306) supplies the input of the in-loop filter component (316). The in-loop filter component (316) smoothes artifacts created by the block nature of the encoding process to improve the visual quality of the decoded frame. The output of the in-loop filter component (316) is the decoded frames of the video bit stream.

Each decoded prediction block is stored in the frame storage component (312) to be used as reference frame data. Further, reference frame data may be stored for multiple previously encoded frames. More specifically, in some video compression standards, multiple reference frames may be stored in the frame storage component (312) and used for motion compensation. For example, H.264 allows for the use of multiple reference frames for motion compensation for both P-frames and B-frames. In some embodiments of the invention, the frame storage component (312) is external memory, i.e., off-chip memory.

Figure 4:
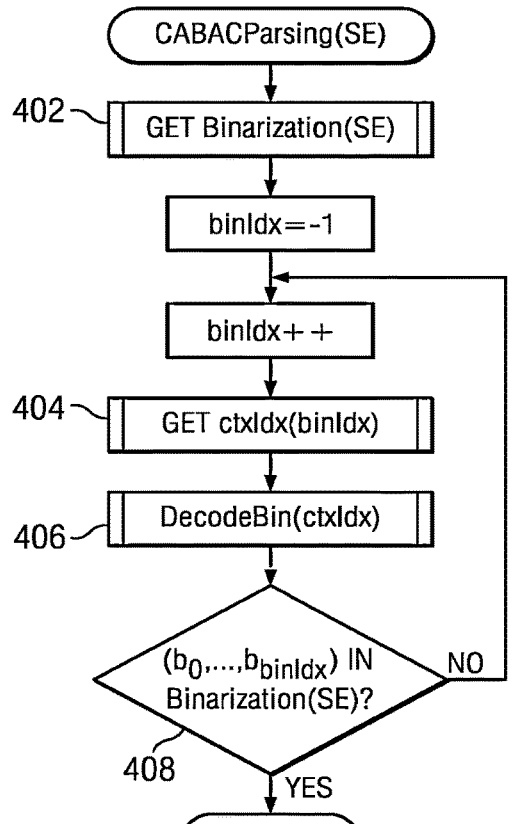
FIG. 4 is a flow diagram illustrating bin decoding.

FIG. 4 is a flow diagram illustrating bin decoding. In order to better understand the improved pipeline decoupled bin decoding described herein, the general bin decoding process used by entropy decoder block 300 will be briefly described with. While the general concepts used for sequential bin decoding will be described herein, there are many detailed aspects and special cases not described herein that are used in the H.264 environment. A complete description of H.264 sequential bin decoding is contained within the H.264 standard, for example.

As mentioned before, CABAC has multiple probability modes for different contexts. When parsing of a new slice is started, an initialization process is performed that determines a context index (ctxIdx) and values for variables m and n, which are provided in tables as described in more detail in H.264 section 9.3. Based on these values, a value for the most probable symbol (vaIMPS) and a value for a probability state index (PStateIdx) is initialized.

For each requested value of a syntax element, a binarization 402 is derived. The binarization for the syntax element and the sequence of parsed bins determines the decoding process flow. The output of this process is the binarization of the syntax element, maximum bin index for this context (maxBinIdxCtx), context index offset (ctxIdxOffset), and bypassFlag. Except for I slices, the binarizations for the syntax element coding block type contexts, for example, consist of bin strings given by a concatenation of prefix and suffix bit strings. Associated with each binarization or binarization part of a syntax element is a specific value of the context index offset (ctxIdxOffset) variable and a specific value of the maxBinIdxCtx variable, which are provided in Tables as defined in H.264.

For each bin of the binarization of the syntax element, which is indexed by the variable binIdx, a context index ctxIdx is derived 404, by consulting context index increment (ctxIdxInc) tables as defined by H.264 and processing the derived index increment value and index offset value.

For each ctxIdx the arithmetic decoding process 406 is invoked. The status of the arithmetic decoding engine is represented by the variables codIRange and codIOffset. In the initialization procedure of the arithmetic decoding process, codIRange is set equal to 0x01FE and codIOffset is set equal to the value returned from read_bits(9) interpreted as a 9 bit binary representation of an unsigned integer with most significant bit written first. Arithmetic coding is based on the principle of recursive interval subdivision. Given a probability estimation $p(0)$ and $p(1)=1-p(0)$ of a binary decision (0, 1), an initially given code sub-interval with the range codIRange will be subdivided into two sub-intervals having range $p(0)*codIRange$ and $codIRange-p(0)*codIRange$, respectively. Depending on the decision, which has been observed, the corresponding sub-interval will be chosen as the new code interval, and a binary code string pointing into that interval will represent the sequence of observed binary decisions. It is useful to distinguish between the most probable symbol (MPS) and the least probable symbol (LPS), so that binary decisions may be identified as either MPS or LPS, rather than 0 or 1. Given this terminology, each context is specified by the probability pLPS of the LPS and the value of MPS (valMPS), which is either 0 or 1.

The arithmetic core engine in H.264 has three distinct properties:

the probability estimation is performed by means of a finite-state machine with a table-based transition process between 64 different representative probability states $$\{pLPS(pStateIdx)|0<=pStateIdx<64\}$$

for the LPS probability pLPS. The numbering of the states is arranged in such a way that the probability state with index pStateIdx=0 corresponds to an LPS probability value of 0.5, with decreasing LPS probability towards higher state indices;

the range codIRange representing the state of the coding engine is quantized to a small set $\{Q1, \ldots, Q4\}$ of pre-set quantization values prior to the calculation of the new interval range. Storing a table containing all 64×4 pre-computed product values of $Qi*pLPS(pStateIdx)$ allows a multiplication-free approximation of the product $codIRange*pLPS(pStateIdx)$;

for syntax elements or parts thereof for which an approximately uniform probability distribution is assumed to be given a separate simplified encoding and decoding bypass process is used.

The decoding process is performed by transitioning from one probability state to a next one. Depending on the decoded value binVal, the update of the two variables pStateIdx and valMPS associated with ctxIdx is derived as illustrated in Table 1. State transition rules are defined in tables as defined by H.264.

TABLE 1

| Probablility state update |
|---|
| if( binVal = = valMPS )<br>  pStateIdx = transIdxMPS( pStateIdx )<br>else {<br>  if( pStateIdx = = 0 )<br>    valMPS = 1 − valMPS<br>  pStateIdx = transIdxLPS( pStateIdx )<br>} |

A renormalization process (RenormD) is performed in the arithmetic decoding engine 406 as decoding progresses. Inputs to this process are bits from slice data and the variables codIRange and codIOffset. Outputs of this process are the updated variables codIRange and codIOffset. The current value of codIRange is first compared to 0x0100 and further steps are specified as follows.

If codIRange is greater than or equal to 0x0100, no renormalization is needed and the RenormD process is finished;

Otherwise (codIRange is less than 0x0100), the renormalization loop is entered. Within this loop, the value of codIRange is doubled, i.e., left-shifted by 1 and a single bit is shifted into codIOffset by using read_bits(1).

The bitstream does not contain data that results in a value of codIOffset being greater than or equal to codIRange upon completion of this process.

Inverse binarization is performed by comparing 408 the resulting sequence (b0 . . . bbinIdx) of parsed bins to the set of bin strings given by the binarization process after decoding of each bin. When the sequence matches a bin string in the given set, the corresponding value is assigned to the syntax element.

Referring again to FIG. 3, as mentioned earlier, entropy decoder 300 may be decoupled from the rest of the decoding pipeline in decoder 112 by using buffer memory 301 to store partial results of the arithmetic decoding process.

Figure 5:
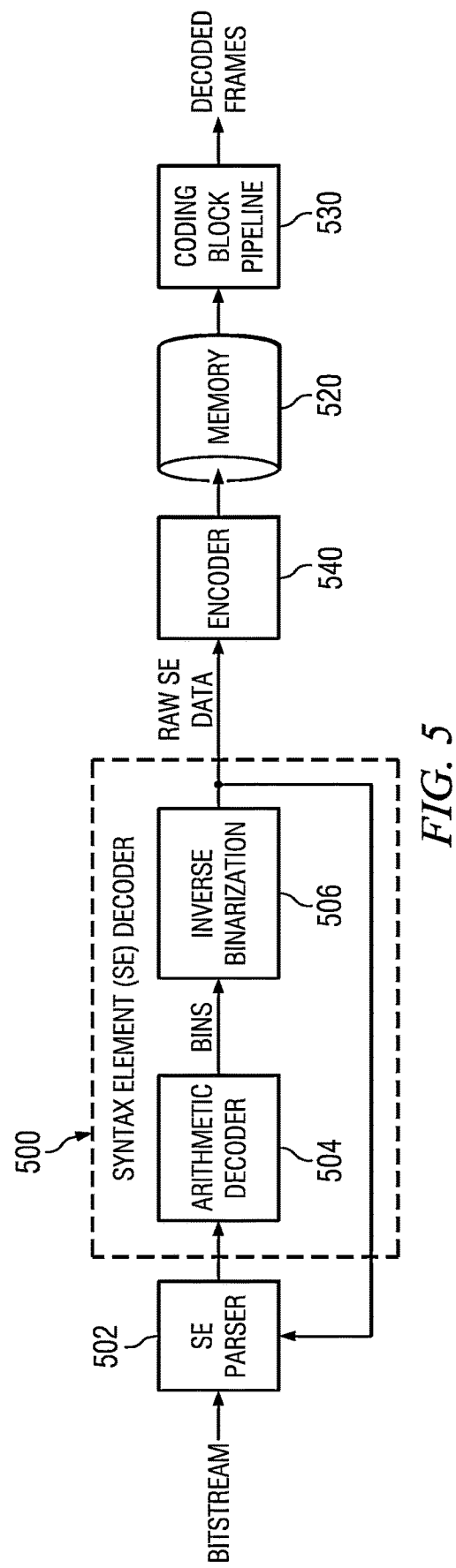
FIG. 5 is a block diagram illustrating a simple configuration for decoupling an entropy decoder from a coding block decoding pipeline.

FIG. 5 is a block diagram illustrating a simple configuration for decoupling an entropy decoder 500 from a coding block decoding pipeline 530. This configuration makes use of load averaging over multiple CBs. This entropy decoder includes a syntax element (SE) parser 502 followed by an arithmetic decoding engine 504 and an inverse binarization module 506 that implements CABAC decoding. The output of the decoding is uncompressed raw SE data. The raw data is written to a buffer memory 520 to be read and used by following stages of video decoding 530, e.g. inverse transform, motion compensation etc. as described with regard to FIG. 3.

The size of the required buffer memory 520 gets larger depending on how much earlier the CABAC engine 500 is kicked-off before the rest of the CB processing pipeline. In a typically implementation, buffer memory 520 may be sized to hold raw SE data for 16-32 coding blocks, for example. Each coding block may require approximately one Kbyte to hold the raw SE data. Therefore, buffer memory 520 may be 32 Kbytes to provide buffering for 32 coding blocks. If the decoding time for entropy decoder falls behind the time budget for 32 coding blocks, then the pipeline may need to be stalled to allow the entropy decoder to catch up.

For an HD (high definition) image with 1920×1088 pixels, there are 8160 coding blocks (1920/16*1088/16), assuming a 16×16 coding block. So one frame of data in FIG. 5 would need approx. 8K*1K=8 MB in buffer memory 520. This translates into a data bandwidth requirement of approximately 8 MB*30 fps=240 Mbytes/sec.

In some embodiments, encoder 540 may be used to reduce the size needed for buffer memory 520 when full frame buffering is performed. However, the encoded raw SE data must then be decoded when removed from buffer memory 520 and processed by coding block pipeline 530. In other embodiments, encoder 540 is not present and uncompressed raw SE data is stored in buffer memory 520.

Figure 6:
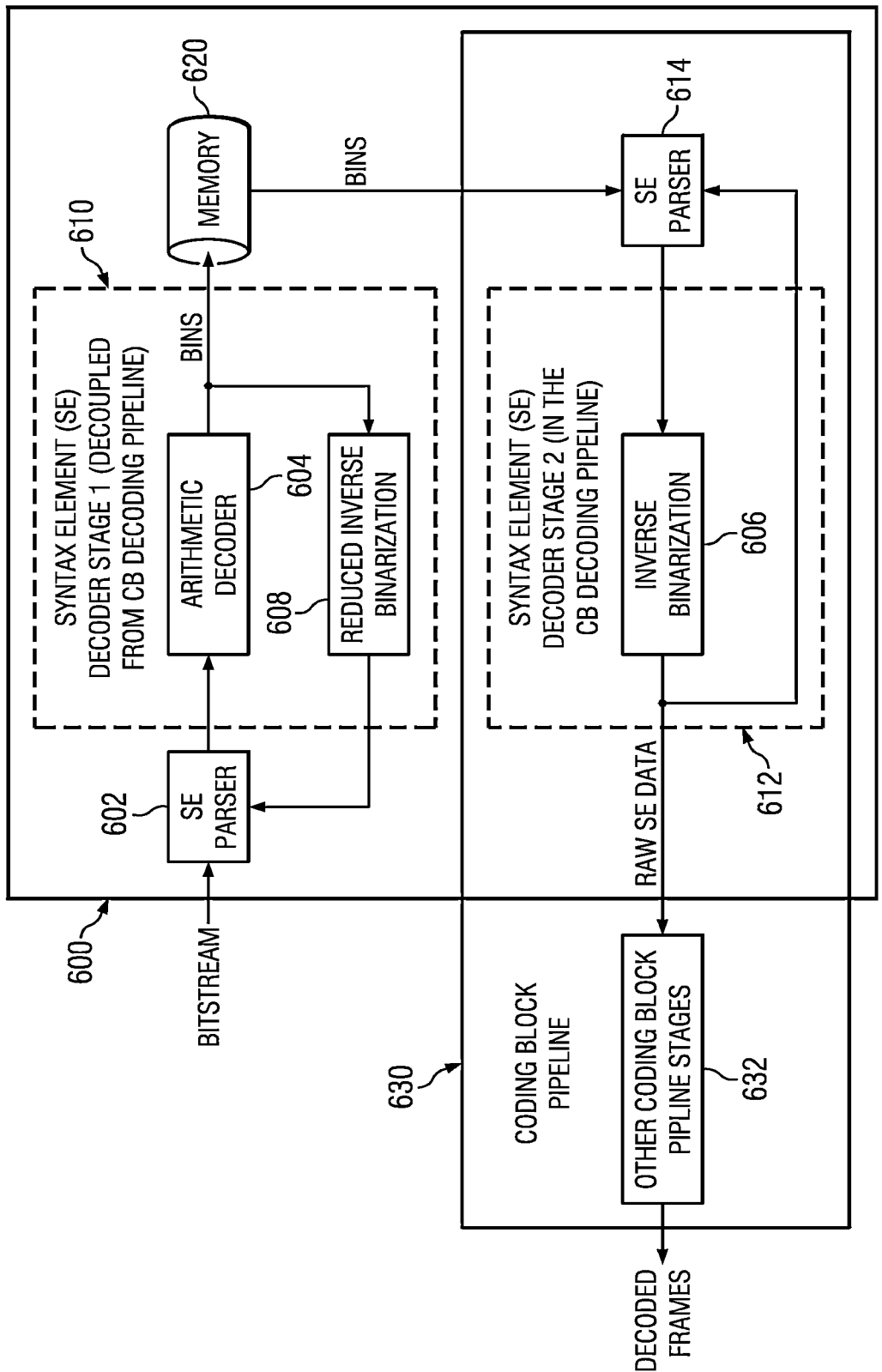
FIGS. 6 and 7 are block diagrams illustrating more complex configurations of a decoupled entropy decoder.

FIG. 6 is a block diagram illustrating a more complex configuration of a decoupled entropy decoder 600. In this embodiment, the syntax element decoder is divided into two stages 610 and 612. First stage 610 is time-wise decoupled from the coding block decoding pipeline 630, while second stage 612 is tightly coupled to the coding block decoding pipeline 630 and operates in lock step with it. Stage 1 (610) includes arithmetic decoder 604 that performs CABAC decoding, as described in more detail above, and forms a bin (binary symbol) string. However, arithmetic decoder 604 is split from inverse binarization module 606. Instead of storing the uncompressed raw SE data as is done in FIG. 5, the bin string generated by arithmetic decoder 604 is stored in buffer memory 620. Memory read/write bandwidth for buffer memory 620 is reduced by this configuration since the bin string is smaller in size than raw SE data. In this embodiment, the data stored in buffer memory 620 does not need to be compressed to reduce size/bandwidth since the bin data is already a compressed form of data.

For example, for an HD image with 1920×1088 pixels, the worst case bitrate is around 50 Mbits/sec. Typically, each bit generates around 1.3 bins. So the bin rate would be approximately 65 Mbins/sec. This translates to approximately 8.125 Mbytes/sec in FIG. 6. In an application where there are 30 frames per second, buffer memory 620 might need to be only (8.125 Mbytes/30)=270 Kbytes to buffer an entire frame of bin data. However, since the bit rate fluctuates (e.g. an I-frame is typically 3 times a P-frame), one frame could end up requiring more than 270 kbytes. In one embodiment, buffer memory 620 may be a one Mbyte buffer, for example.

In another embodiment, the size of buffer memory 620 may depend on the highest bitrate that needs to be supported. In some embodiments, the bitrate is software programmable. In such an embodiment, buffer memory 620 may be sized to handle the highest bitrate that can be processed by CABAC decoder 600.

First stage 610 includes reduced inverse binarization logic 608. In order for arithmetic decoder 604 to complete the decoding of a bin stream, some feedback needs to be provided to SE parser 602. For example, motion vectors need to be determined in order to select the correct context to use as the CABAC decoding progresses. Reduced inverse binarization logic 608 computes the raw values of SE's that are needed to allow SE parser 602 to operate correctly. Conversely, coefficient values and levels do not need to be decoded in order for the SE parser to operate correctly.

The bin data that is temporarily stored in buffer memory 620 may be the actual bin data, such as the motion vector difference values, for example.

When other pipeline stages 632 in coding block pipeline 630 of the video decoder need the SE data to produce decoded frames of video data, buffered bins are parsed by SE parser 614 and processed by inverse binarization logic 606 inside the main CB decoding pipeline. Unlike the arithmetic decoding, the inverse binarization performed by logic 612 does not involve complex operations. The most complex operation is the exp-golomb decoding required for some SEs. Therefore raw SE data of a coding block can be reconstructed inside the pipeline in real-time with simple hardware architecture even for high bin per CB counts.

The decoder of FIG. 6 results in a smaller buffer memory size and bandwidth requirement for buffer memory 620 as compared to buffer memory 520 at the expense of additional reduced inverse binarization and parsing logic. For example, as discussed above, the bandwidth needed for buffer memory 520 may be approximately 240 mbytes/sec for an HD image of 1920×1088 pixels, while the bandwidth needed for buffer memory 620 may be only 8.125 Mbytes/sec for the same HD image. This may simplify the implementation of memory buffer 620.

Figure 7:
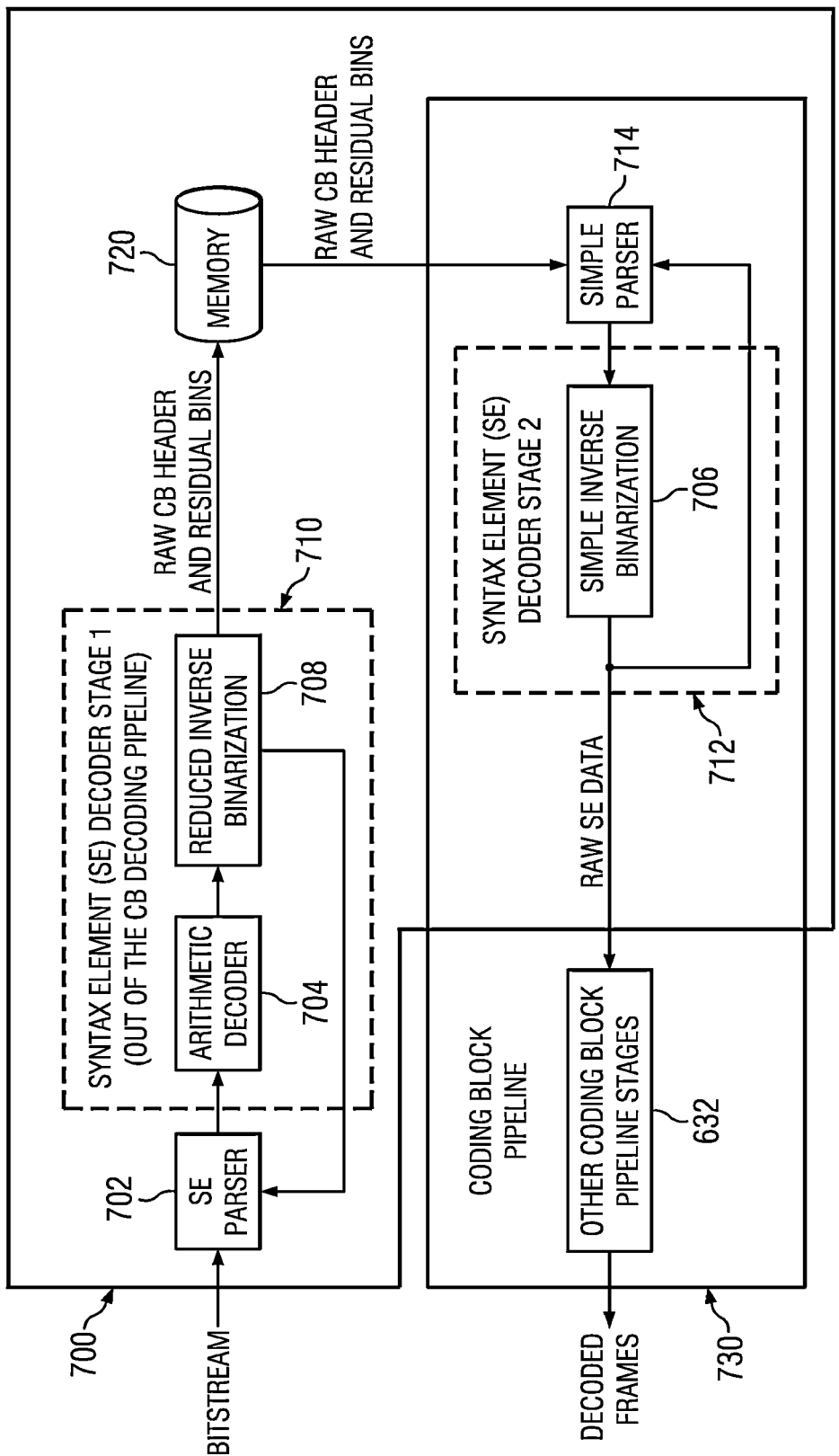

FIG. 7 is a block diagram illustrating another embodiment of a decoupled entropy decoder 700. This embodiment may be somewhat less complex to implement than entropy decoder 600 of FIG. 6. In this embodiment, a first stage 710 of the entropy decoder is time-wise decoupled from coding block pipeline 730 using buffer memory 720. Coding block pipeline 730 includes a second stage 712 of the entropy decoder that provides raw SE data to the remaining pipeline stages 632. Pipeline stages 632 operate in a similar manner as described above to produce decoded frames of video data.

In this example, SE parser 702, arithmetic decoder 704 and reduced inverse binarization logic 708 of first stage 710 operate in a similar manner as described above; however, each CB header is completely decoded and is stored in raw SE format in buffer memory 720 while remaining syntax elements are stored as bins in buffer memory 720. This approach simplifies the parsing logic 714 that is connected to second stage 712. Inverse binarization logic 706 is also simplified. However, this simplification comes at the expense of larger memory access bandwidth for buffer memory 720 since the fully decoded headers in raw SE format are larger than the bins from which they are decoded.

While the above embodiments are directed to a CABAC engine in H.264, this decoupled approach may also be applied to other entropy formats used in other standards such as SVC (scalable video coding extension of H.264), MVC (multi-view video coding extension of H.264 for 3D), China AVS, etc.

This approach may also be applied to the entropy slice concept being considered for the high efficiency video coding (HEVC) standard being considered as a successor to H.264. The HEVC standard may use/need picture-level buffer storage and access for storing decoded syntax information obtained from parallel decoding of entropy slices. The decoded syntax elements require huge memory bandwidth. Data compression as described above with regard to FIGS. 6 and 7 may be used to store decoded HEVC syntax information.

Referring again to FIGS. 1 and 3, in some embodiments of video decoder 112, entropy decoder 300 may be configured under software control to operate as described with respect to FIG. 5 for some applications and to operate as described with regard to FIG. 6 or 7 for other applications. For example, digital system 102 may be part of a broadcast television receiver. In this case, video decoder 112 may be configured by system control software 132 to operate as described with respect to FIG. 6 or 7 to handle high definition video streams. In another application, digital system 102 may be part of a camcorder that is only handling relatively low resolution video streams. In this application, video decoder 112 may be configured by system control software 132 to operate as described with regard to FIG. 5.

The system control software required to operate video decoder 112 according to FIG. 5 may be simpler than control software required to operate video decoder 112 according to FIG. 6 or 7.

In other embodiments, entropy decoder 300 may be hardcoded or configured by software to operate as described with respect to FIG. 6 or with respect to FIG. 7.

Figure 8:
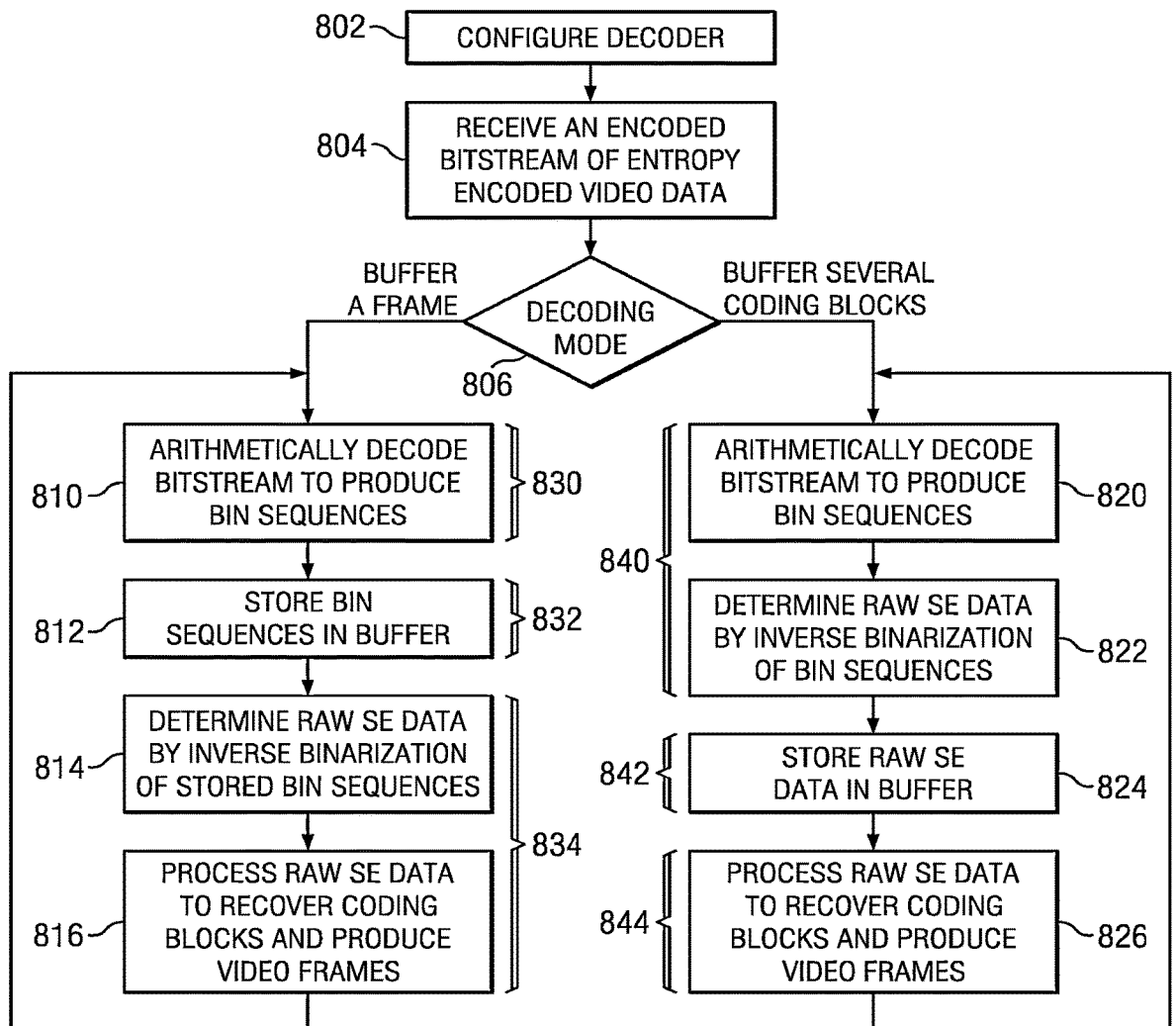
FIG. 8 shows a flow diagram of a method in accordance with one or more embodiments of the invention.

FIG. 8 shows a flow diagram of a method in accordance with one or more embodiments of the invention. The decoder is first configured 802. In some embodiments, this is done by hardwiring or hard coding a specific mode of operation, while in other embodiments the decoder may be configured under control of software executed by a processor coupled to the decoder each time the decoder is initialized, such as when the decoder is turned on. The decoder may be configured as described in more detail above and with respect to FIGS. 5-7.

After the decoder is configured, it may receive 804 an encoded bitstream of entropy encoded video data, wherein the encoded bitstream represents syntax elements of a sequence of coding blocks.

When 806 the decoder is configured to operate according to FIG. 6 or FIG. 7, a buffer memory may be configured to provide bin sequence storage for approximately a video frame's worth of coding blocks. In some embodiments, less storage is provided, while in other embodiments more storage may be provided.

The encoded bitstream is arithmetically decoded 810 to produce bin sequences for each coding block. A minimal amount of inverse binarization may be performed so that a syntax parsing function can select the correct context for each bin sequence that is decoded. When the decoder is configured to operate according to FIG. 7, additional decoding is performed to recover header information from the decoded bin sequences.

The decoded bin sequences are stored 812 as they are decoded in the buffer memory. In this manner, a buffer that is operable to hold bin sequences for a plurality of coding blocks is formed. This allows the arithmetic decoding 810 to be time-wise decoupled from reverse binarization 814.

Raw syntax element data is determined 816 for a coding block by performing inverse binarization on bin sequences retrieved from the buffer memory. Additional syntax element parsing may be performed at this point of determine the correct context to use for the inverse binarization of each bin sequence. When the decoder is configured to operate according to FIG. 7, the syntax element parsing is simplified since header data was already recovered and stored in the buffer memory.

The raw syntax element data is processed 816 in a pipelined manner to recover the coding blocks and thereby reproduce the original video frames that may then be displayed or otherwise used.

When 806 the decoder is configured to operate according to FIG. 5, a buffer memory may be configured to provide bin sequence storage for approximately 16-32 coding blocks. In some embodiments, less storage is provided, while in other embodiments more storage may be provided. In this configuration, the encoded bitstream is arithmetically decoded 820 to produce bin sequences for each coding block, and raw syntax element data is determined 822 from the bin sequences by inverse binarization as the bin sequences are decoded. The raw syntax element data is then stored in the buffer memory. This allows the arithmetic decode and reverse binarization function to be time-wise decoupled from the remaining processing 826 that may operate in a pipelined manner to recover the coding blocks and thereby reproduce the original video frames that may then be displayed or otherwise used.

For the portion of the decoder that operates in a pipelined manner as indicated at 834 and 844, a defined amount of time is allocated for each coding block so that the overall coding block rate meets the design requirements for the system. The coding block rate may be different for different types of systems and depends on several factors, such as the pixel size of each frame and the number of frames per second for the target video stream.

For the portion of the decoder that performs arithmetic decoding, as indicated at 830 and 840, a maximum time may be incurred to decode a complex coding block. As described above, by providing a buffer as indicated at 832 and 842, the arithmetic decoding process is time-wise decoupled from the pipeline processing. This allows the arithmetic decoding to take the maximum time for complex coding blocks and then catch up on average since many coding blocks are simpler and take less than the maximum time to decode. This allows the decoder to be configured so that the maximum time for arithmetic decoding is larger than the defined amount of time for the remaining pipeline processing.

Another embodiment of the invention may be in a video encoder. An H.264 encoder includes a decoder that may be embodied as described in more detail below. Referring again to FIG. 1, encoder 106 may be part of a source digital system 100 that captures a video stream and transmits it in a compressed format. Source digital system 100 may be combined with a destination digital system 102 in a video camera, for example, or in other types of video capture and display devices.

Figure 9:
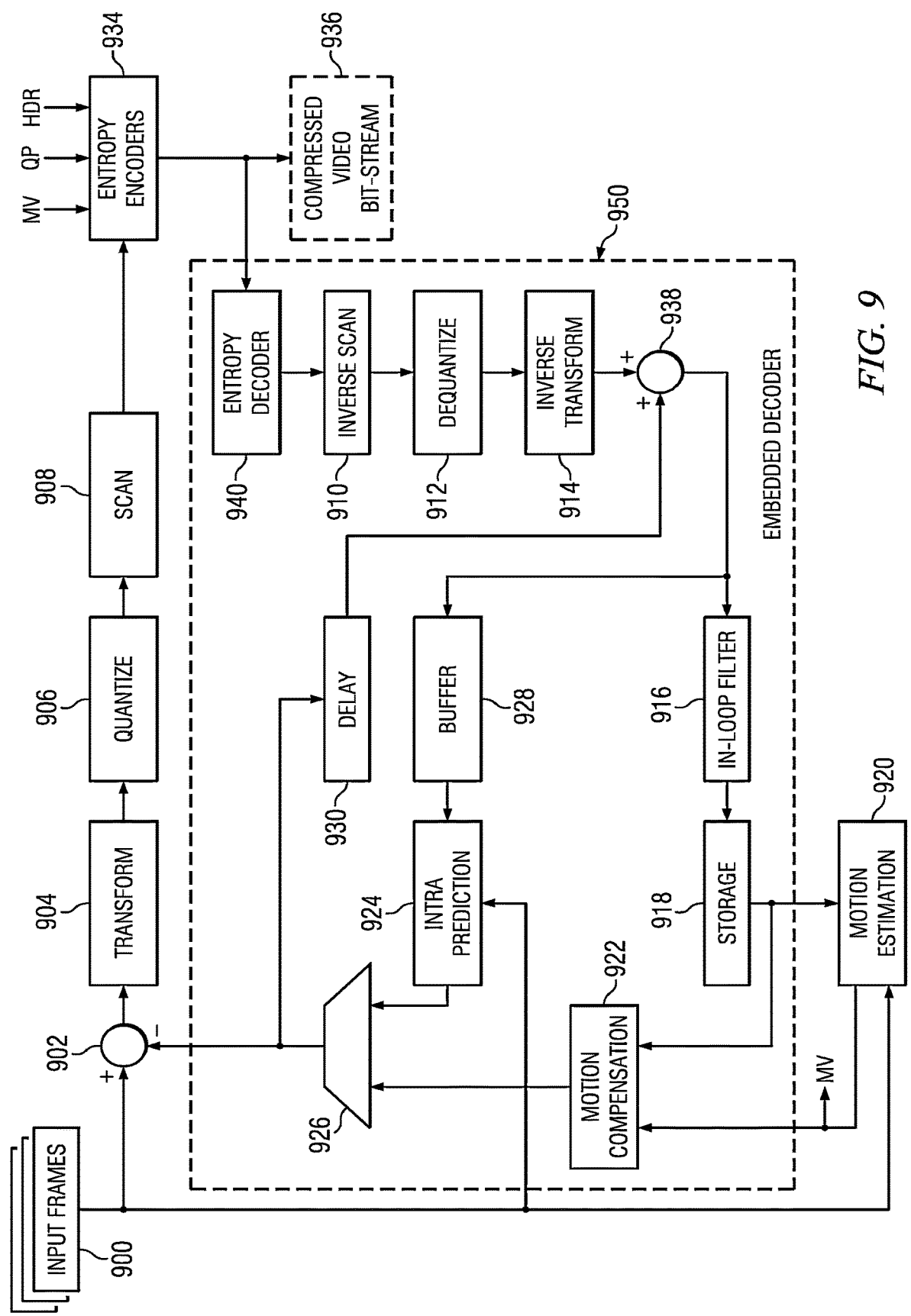
FIG. 9 shows a block diagram of a video encoder in accordance with one or more embodiments of the invention.

FIG. 9 shows a block diagram of a video encoder, such as the video encoder (106) of FIG. 1, in accordance with an embodiment of the invention. In the video encoder of FIG. 9, input frames (900) for encoding are divided into coding blocks, e.g., macroblocks, and the coding blocks are provided as one input of a motion estimation component (920), as one input of an intra prediction component (924), and to a positive input of a combiner (902) (e.g., adder or subtractor or the like). Further, although not specifically shown, a prediction mode, i.e., inter-prediction or intra-prediction, for each input frame is selected and provided to a mode selector component and the entropy encoders (934).

The frame storage component (918) stores reference frame data generated by the embedded decoder. The reference frame data may include one or more previously encoded and decoded coding blocks, i.e., reconstructed coding blocks. Further, reference frame data may be stored for multiple previously encoded frames. More specifically, in some video compression standards, multiple reference frames may be stored in the frame storage component (918) and used for motion prediction and motion compensation. For example, H.264 allows for the use of up to sixteen reference frames for motion prediction and motion compensation. In some embodiments of the invention, the frame storage component (918) is external memory, i.e., off-chip memory. Any suitable tiled addressing scheme may be used for the frame storage component (918).

The motion estimation component (920) provides motion estimation information to the motion compensation component (922) and the entropy encoders (934). More specifically, the motion estimation component (920) performs tests on coding blocks based on multiple temporal prediction modes using reference frame data to choose the best motion vector(s)/prediction mode based on a coding cost. To test the prediction modes, the motion estimation component (920)

may divide a coding block into prediction blocks according to the block size of a prediction mode. The motion estimation component (920) provides the selected motion vector (MV) or vectors and the selected prediction mode to the motion compensation component (922) and the selected motion vector (MV) to the entropy encoders (934). The motion compensation component (922) provides motion compensated inter prediction information to a selector switch (926) that includes motion compensated inter prediction blocks and the selected temporal prediction modes. The coding cost of the inter prediction blocks are also provided to the mode selector component.

The intra prediction component (924) provides intra prediction information to the selector switch (926) that includes intra prediction blocks and the corresponding spatial prediction modes. That is, the intra prediction component (924) performs spatial prediction in which tests based on multiple spatial prediction modes are performed on the coding block using previously encoded neighboring blocks of the frame from the buffer (928) to choose the best spatial prediction mode for generating an intra prediction block based on a coding cost. To test the spatial prediction modes, the intra prediction component (924) may divide a coding block into prediction blocks according to the block size of a prediction mode. Although not specifically shown, the coding cost of the intra prediction blocks are also provided to the mode selector component.

The selector switch (926) selects between the motion-compensated inter prediction blocks from the motion compensation component (922) and the intra prediction blocks from the intra prediction component (924) based on the difference metrics of the blocks and a frame prediction mode provided by the mode selector component. The output of the selector switch (926), i.e., the predicted prediction block, is provided to a negative input of the combiner (902) and to a delay component (930). The output of the delay component (930) is provided to another combiner (i.e., an adder) (938). The combiner (902) subtracts the predicted prediction block from the current prediction block of the current coding block to provide a residual prediction block to the transform component (904). The resulting residual prediction block is a set of pixel difference values that quantify differences between pixel values of the original prediction block and the predicted prediction block.

The transform component (904) performs a block transform e.g., a discrete cosine transform (DCT), on the residual prediction blocks to convert the residual pixel values to transform coefficients and outputs the transform coefficients. The transform coefficients from the transform component (904) are provided to a quantization component (906) which outputs quantized transform coefficients. Because the block transform redistributes the energy of the residual signal into the frequency domain, the quantized transform coefficients are taken out of their raster-scan ordering a scan component (908) and arranged by significance, such as, for example, beginning with the more significant coefficients followed by the less significant. The ordered quantized transform coefficients provided via the scan component (908) along with header information are coded by the entropy encoder (934), which provides a compressed bit stream (936) for transmission or storage. The entropy coding performed by the entropy encoder (934) may be any suitable entropy encoding techniques, such as, for example, context adaptive variable length coding (CAVLC), context adaptive binary arithmetic coding (CABAC), run length coding, etc.

The encoder of FIG. 9 includes an embedded decoder 950. As any compliant decoder is expected to reconstruct an image from a compressed bit stream, the embedded decoder 950 provides the same utility to the video encoder. Knowledge of the reconstructed input allows the video encoder to transmit the appropriate residual energy to compose subsequent frames. To determine the reconstructed input, i.e., reference frame data, the ordered quantized transform coefficients provided via the scan component (908) are returned to their original post-transform arrangement by an inverse scan component (910), the output of which is provided to a dequantize component (912), which outputs estimated transformed information, i.e., an estimated or reconstructed version of the transform result from the transform component (904). The estimated transformed information is provided to the inverse transform component (914), which outputs estimated residual information which represents a reconstructed version of the residual prediction block. The reconstructed residual prediction block is provided to the combiner (938).

In order to further improve the accuracy of the determination of residual energy, entropy decoder 940 decodes the compressed video bitstream produced by entropy encoder 934. Entropy decoder 940 is decoupled from the coding block pipeline formed by inverse scan stage 910, dequantize stage 912 and inverse transform stage 914 by a buffer memory (not shown) and operates as was described in more detail with respect to FIG. 5, 6, or 7.

The combiner (938) adds the delayed selected prediction block to the reconstructed residual prediction block to generate an unfiltered reconstructed prediction block, which becomes part of reconstructed frame information. The reconstructed frame information is provided via a buffer (928) to the intra prediction component (924) and to a filter component (916). The filter component (916) is an in-loop filter which filters the reconstructed frame information and provides filtered reconstructed coding blocks, i.e., reference frame data, to the frame storage component (918).

Embodiments of the decoders and methods described herein may be provided on any of several types of digital systems: digital signal processors (DSPs), general purpose programmable processors, application specific circuits, or systems on a chip (SoC) such as combinations of a DSP and a reduced instruction set (RISC) processor together with various specialized programmable accelerators. A stored program in an onboard or external (flash EEP) ROM or FRAM may be used to implement the video signal processing. Analog-to-digital converters and digital-to-analog converters provide coupling to the real world, modulators and demodulators (plus antennas for air interfaces) can provide coupling for transmission waveforms, and packetizers can provide formats for transmission over networks such as the Internet.

The techniques described in this disclosure may be implemented in hardware, software, firmware, or any combination thereof. If implemented in software, the software may be executed in one or more processors, such as a microprocessor, application specific integrated circuit (ASIC), field programmable gate array (FPGA), or digital signal processor (DSP). The software that executes the techniques may be initially stored in a computer-readable medium such as compact disc (CD), a diskette, a tape, a file, memory, or any other computer readable storage device and loaded and executed in the processor. In some cases, the software may also be sold in a computer program product, which includes the computer-readable medium and packaging materials for the computer-readable medium. In some cases, the software instructions may be distributed via removable computer readable media (e.g., floppy disk, optical disk, flash memory, USB key), via a transmission path from computer readable media on another digital system, etc.

Figure 12:
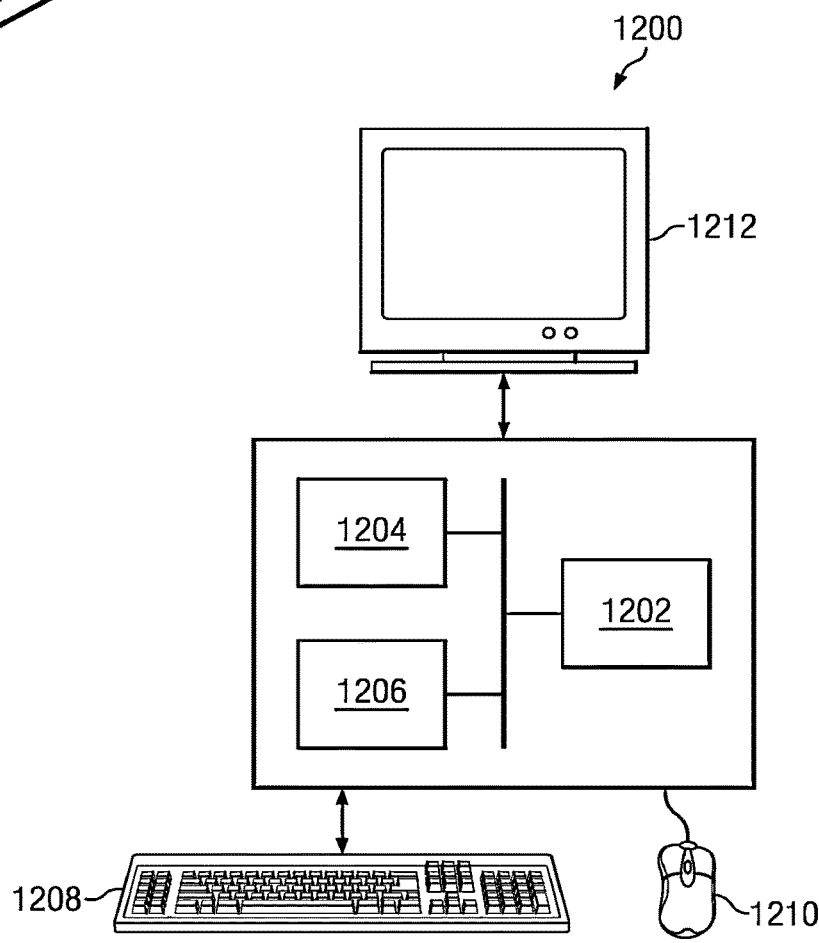
FIGS. 10-12 show illustrative digital systems in accordance with one or more embodiments of the invention.
Figure 10:
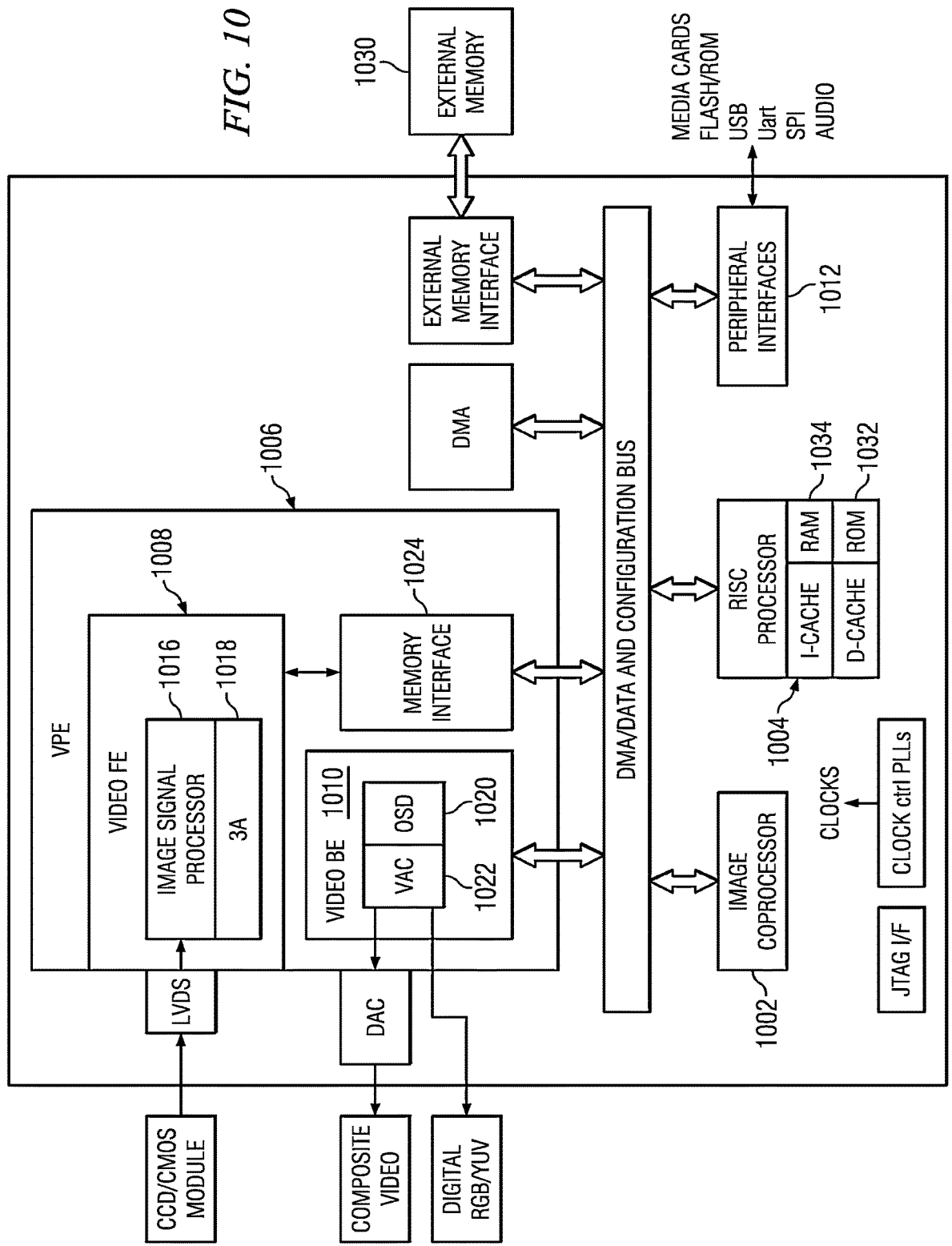
Figure 11:
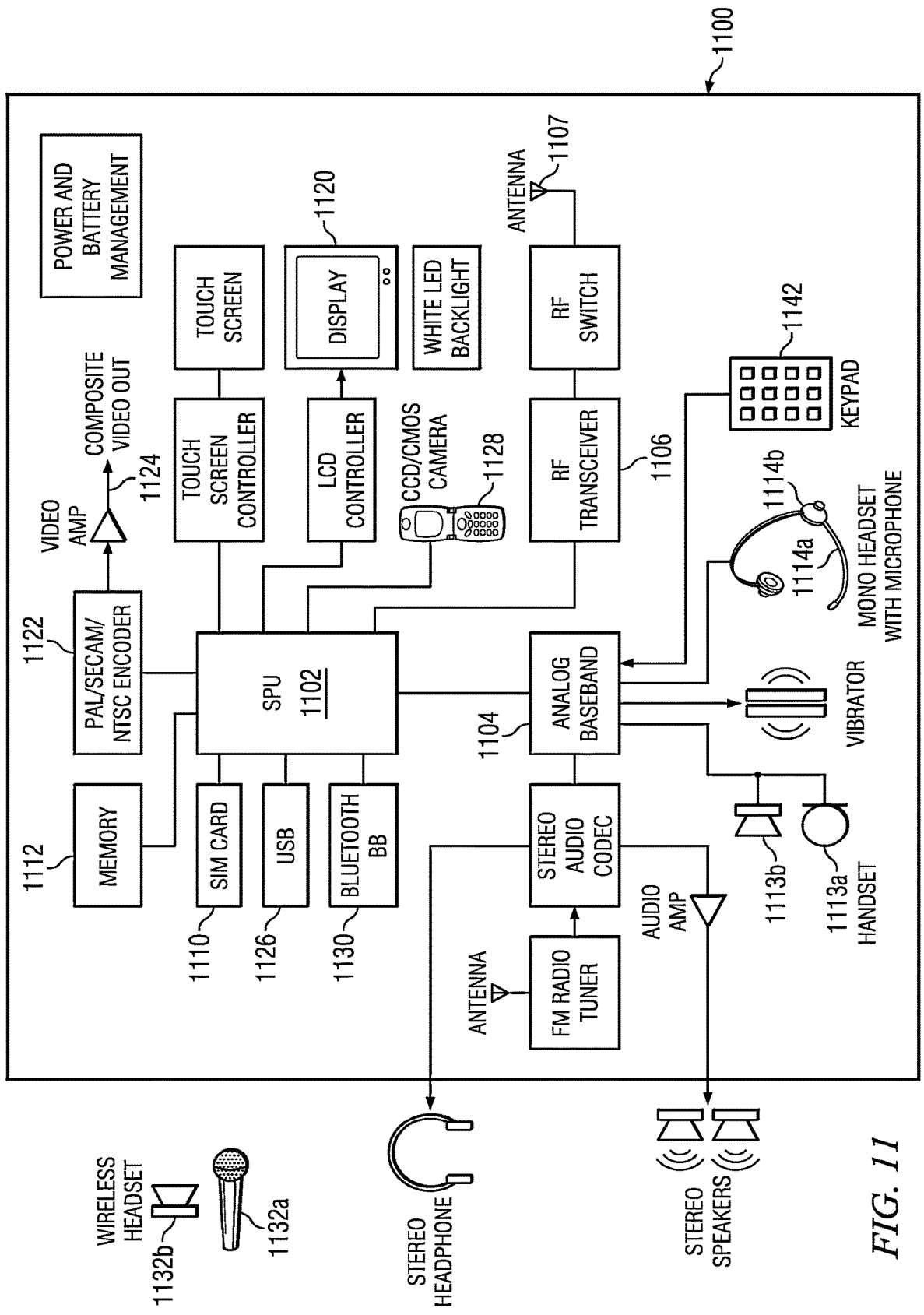

Embodiments of video encoders and video decoders as described herein may be implemented for virtually any type of digital system (e.g., a desk top computer, a laptop computer, a notebook computer, a handheld device such as a mobile (i.e., cellular) telephone or MP3 player, a personal digital assistant, a digital video camera, a set top box, a digital video recorder (DVR), etc., with functionality to capture (or otherwise generate) digital video sequences and/or to receive and display video sequences. FIGS. 10-12 show block diagrams of illustrative digital systems.

FIG. 10 shows a digital system suitable for an embedded system (e.g., a digital camera) in accordance with one or more embodiments of the invention that includes, among other components, a DSP-based image coprocessor (ICP) (1002), a RISC processor (1004), and a video processing engine (VPE) (1006) that may be configured to perform methods as described herein. The RISC processor (1004) may be any suitably configured RISC processor. The VPE (1006) includes a configurable video processing front-end (Video FE) (1008) input interface used for video capture from imaging peripherals such as image sensors, video decoders, etc., a configurable video processing back-end (Video BE) (1010) output interface used for display devices such as SDTV displays, digital LCD panels, HDTV video encoders, etc, and memory interface (1024) shared by the Video FE (1008) and the Video BE (1010). The digital system also includes peripheral interfaces (1012) for various peripherals that may include a multi-media card, an audio serial port, a Universal Serial Bus (USB) controller, a serial port interface, etc.

The Video FE (1008) includes an image signal processor (ISP) (1016), and a 3A statistic generator (3A) (1018). The ISP (1016) provides an interface to image sensors and digital video sources. More specifically, the ISP (1016) may accept raw image/video data from a sensor (CMOS or CCD) and can accept YUV video data in numerous formats. The ISP (1016) also includes a parameterized image processing module with functionality to generate image data in a color format (e.g., RGB) from raw CCD/CMOS data. The ISP (1016) is customizable for each sensor type and supports video frame rates for preview displays of captured digital images and for video recording modes. The ISP (1016) also includes, among other functionality, an image resizer, statistics collection functionality, and a boundary signal calculator. The 3A module (1018) includes functionality to support control loops for auto focus, auto white balance, and auto exposure by collecting metrics on the raw image data from the ISP (1016) or external memory.

The Video BE (1010) includes an on-screen display engine (OSD) (1020) and a video analog encoder (VAC) (1022). The OSD engine (1020) includes functionality to manage display data in various formats for several different types of hardware display windows and it also handles gathering and blending of video data and display/bitmap data into a single display window before providing the data to the VAC (1022) in YCbCr format. The VAC (1022) includes functionality to take the display frame from the OSD engine (1020) and format it into the desired output format and output signals required to interface to display devices. The VAC (1022) may interface to composite NTSC/PAL video devices, S-Video devices, digital LCD devices, high-definition video encoders, DVI/HDMI devices, etc.

The memory interface (1024) functions as the primary source and sink to modules in the Video FE (1008) and the Video BE (1010) that are requesting and/or transferring data to/from external memory. The memory interface (1024) includes read and write buffers and arbitration logic.

The ICP (1002) includes functionality to perform the computational operations required for video encoding and other processing of captured images. The video encoding standards supported may include one or more of the JPEG standards, the MPEG standards, and the H.26x standards. In one or more embodiments of the invention, the ICP (1002) may be configured to perform entropy decoding as described herein.

In operation, to capture an image or video sequence, video signals are received by the video FE (1008) and converted to the input format needed to perform video encoding. The video data generated by the video FE (1008) is stored in then stored in external memory. The video data is then encoded by a video encoder and stored in external memory. During the encoding, the video encoder may perform entropy decoding as described herein. The encoded video data may then be read from the external memory, decoded, and post-processed by the video BE (1010) to display the image/video sequence.

During the decoding, the video decoder may perform entropy decoding as described herein. Buffer memory for holding decoded bin sequences to allow decoupling of an arithmetic decoder from a processing pipeline within ICP 1002 may be embodied in external memory 1030 or in memory coupled directly to ICP 1002, or within memory 1034 located within processor 1004, for example. Processor 1004 may execute control software stored in memory 1032 or external memory 1030 to configure and control the operation of ICP 1002.

In some embodiments, an entropy decoder implemented within ICP 1002 may be configured under software control to operate as described with respect to FIG. 5 for some applications and to operate as described with regard to FIG. 6 or 7 for other applications. In other embodiments, the entropy decoder may be limited in operation to only FIG. 6 or only FIG. 7, for example.

FIG. 11 is a block diagram of a digital system (e.g., a mobile cellular telephone) (1100) that may be configured to perform entropy decoding as part encoding or decoding a video stream as described herein. The signal processing unit (SPU) (1102) includes a digital signal processing system (DSP) that includes embedded memory and security features. The analog baseband unit (1104) receives a voice data stream from handset microphone (1113*a*) and sends a voice data stream to the handset mono speaker (1113*b*). The analog baseband unit (1104) also receives a voice data stream from the microphone (1114*a*) and sends a voice data stream to the mono headset (1114*b*). The analog baseband unit (1104) and the SPU (1102) may be separate ICs. In many embodiments, the analog baseband unit (1104) does not embed a programmable processor core, but performs processing based on configuration of audio paths, filters, gains, etc being setup by software running on the SPU (1102).

The display (1120) may also display pictures and encoded video streams received from the network, from a local camera (1128), or from other sources such as the USB (1126) or the memory (1112). The SPU (1102) may also send a video stream to the display (1120) that is received from various sources such as the cellular network via the RF transceiver (1106) or the camera (1128). The SPU (1102) may also send a video stream to an external video display unit via the encoder (1122) over a composite output terminal (1124). The encoder unit (1122) may provide encoding according to PAL/SECAM/NTSC video standards.

The SPU (1102) includes functionality to perform computational operations required for video encoding and decoding. The video encoding standards supported may include, for example, one or more of the JPEG standards, the MPEG standards, the H.26x standards and the emerging HEVC standard. In one or more embodiments of the invention, the SPU (1102) is configured to perform entropy decoding as described herein as part of the video encoding and/or decoding process. Software instructions implementing computational requirements of the video encoding/decoding process may be stored in the memory (1112) and executed by the SPU (1102) as part of capturing and/or encoding and/or decoding of digital image data, e.g., pictures and video streams.

FIG. 12 shows a digital system (1200) (e.g., a personal computer) that includes a processor (1202), associated memory (1204), a storage device (1206), and numerous other elements and functionalities typical of digital systems (not shown). In one or more embodiments of the invention, a digital system may include multiple processors and/or one or more of the processors may be digital signal processors. The digital system (1200) may also include input means, such as a keyboard (1208) and a mouse (1210) (or other cursor control device), and output means, such as a monitor (1212) (or other display device). Those skilled in the art will appreciate that the input and output means may take other forms. The digital system (1200) may also include an image capture device (not shown) that includes circuitry (e.g., optics, a sensor, readout electronics) for capturing video sequences. The digital system (1200) may include a video encoder for encoding the video sequences, the video encoder including functionality to perform entropy decoding as described herein.

The digital system (1200) may be connected to a network (not shown) (e.g., a local area network (LAN), a wide area network (WAN) such as the Internet, a cellular network, any other similar type of network and/or any combination thereof) via a network interface connection (not shown). The digital system (1200) may include functionality to receive and display encoded video sequences via the network interface connection, from the storage device (1206), and/or from removable storage media. The digital system (1200) may include a video decoder for decoding the encoded video sequences, the video decoder an entropy decoder decoupled from a coding block pipeline as described herein.

Further, those skilled in the art will appreciate that one or more elements of the aforementioned digital system (1200) may be located at a remote location and connected to the other elements over a network. Further, embodiments of the invention may be implemented on a distributed system having a plurality of nodes, where each portion of the system and software instructions may be located on a different node within the distributed system. In one embodiment of the invention, the node may be a digital system. Alternatively, the node may be a processor with associated physical memory. The node may alternatively be a processor with shared memory and/or resources.

Software instructions to perform computational operations of video decoding, including entropy decoding, as described herein may be stored on a computer readable medium such as a compact disc (CD), a diskette, a tape, a file, memory, or any other computer readable storage device. The software instructions may be distributed to the digital system (1200) via removable computer readable media (e.g., floppy disk, optical disk, flash memory, USB key), via a transmission path from computer readable media on another digital system, etc.

Other Embodiments

While the invention has been described with respect to a limited number of embodiments, those skilled in the art, having benefit of this disclosure, will appreciate that other embodiments can be devised which do not depart from the scope of the invention as disclosed herein. For example, in some embodiments the first and second stage of the entropy decoder may be implemented as distinct hardware modules with the buffer memory coupled between them. In other embodiments, some or all of the processing performed by the first and/or second stage of the entropy decoder may be performed by software executed by a processor. In such an embodiment, the buffer memory may be part of a larger memory module used by the processor for additional storage tasks.

Accordingly, the scope of the invention should be limited only by the attached claims. It is therefore contemplated that the appended claims will cover any such modifications of the embodiments as fall within the true scope and spirit of the invention.

In the above discussion and in the claims, the terms "including" and "comprising" are used in an open-ended fashion, and thus should be interpreted to mean "including, but not limited to . . . ." Also, the term "couple" and derivatives thereof are intended to mean an indirect, direct, optical, and/or wireless electrical connection. Thus, if a first device couples to a second device, that connection may be through a direct electrical connection, through an indirect electrical connection via other devices and connections, through an optical electrical connection, and/or through a wireless electrical connection. Further, example pseudo code is presented herein for illustrative purposes and should not be construed to limit the scope of the claimed invention.

In the above detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description. In addition, although method steps may be presented and described herein in a sequential fashion, one or more of the steps shown and described may be omitted, repeated, performed concurrently, and/or performed in a different order than the order shown in the figures and/or described herein. Accordingly, embodiments of the invention should not be considered limited to the specific ordering of steps shown in the figures and/or described herein.

Further, embodiments of the invention should not be considered limited to any particular video coding standard. In addition, for convenience in describing embodiments of the invention, the term frame may be used to refer to the portion, i.e., block of pixels, of a video sequence being encoded or decoded. One of ordinary skill in the art will understand embodiments of the invention that operate on subsets of frames such as, for example, a slice, a field, a video object plane, a picture, etc.

The invention claimed is:

1. A system comprising:
   a memory; and
   one or more processors coupled to the memory and configured to:
   arithmetically decode a bit stream to generate bin sequences;
   inverse binarize the bin sequences to produce raw syntax element data;

store the raw syntax element data to the memory;
retrieve the raw syntax element data stored in the memory; and
process the raw syntax element data retrieved from the memory to generate coding block data for an image.

2. The system of claim 1, wherein to process the raw syntax element data, the one or more processors are configured to inverse binarize the raw syntax element data to generate the coding block data.

3. The system of claim 1, wherein to process the raw syntax element data, the one or more processors are configured to:
parse the raw syntax element data; and
inverse binarize the parsed raw syntax element data to generate the coding block data.

4. The system of claim 1, wherein the one or more processors are configured to parse the bit stream based on the raw syntax element data.

5. The system of claim 1, wherein to inverse binarize the bin sequences, the one or more processors are configured to exponential Golomb decode at least one of the bin sequences to produce a syntax element in the raw syntax element data.

6. The system of claim 1, wherein the one or more processors are configured to encode the raw syntax element data before storing the raw syntax element data to the memory.

7. The system of claim 1, wherein to process the raw syntax element data, the one or more processors are configured to, in response to receiving a request:
parse the raw syntax element data; and
inverse binarize the parsed raw syntax element data to generate the coding block data.

8. A method comprising:
arithmetically decoding a bit stream to generate bin sequences;
inverse binarizing the bin sequences to produce raw syntax element data;
storing the raw syntax element data to a memory;
retrieving the raw syntax element data stored in the memory; and
processing the raw syntax element data retrieved from the memory to generate coding block data for an image.

9. The method of claim 8, wherein processing the raw syntax element data comprises inverse binarizing the raw syntax element data to generate the coding block data.

10. The method of claim 8, wherein processing the raw syntax element data comprises:
parsing the raw syntax element data; and
inverse binarizing the parsed raw syntax element data to generate the coding block data.

11. The method of claim 8, further comprising parsing the bit stream based on the raw syntax element data.

12. The method of claim 8, wherein inverse binarizing the bin sequences comprises exponential Golomb decoding at least one of the bin sequences to produce a syntax element in the raw syntax element data.

13. The method of claim 8, further comprising encoding the raw syntax element data before storing the raw syntax element data to the memory.

14. The method of claim 8, further comprising receiving a request, wherein processing the raw syntax element data comprises, in response to receiving the request:
parsing the raw syntax element data; and
inverse binarizing the parsed raw syntax element data to generate the coding block data.

15. A non-transitory computer-readable medium having executable instructions stored thereon, configured to be executable by one or more processors for causing the one or more processors to:
arithmetically decode a bit stream to generate bin sequences;
inverse binarize the bin sequences to produce raw syntax element data;
store the raw syntax element data to a memory;
retrieve the raw syntax element data stored in the memory; and
process the raw syntax element data retrieved from the memory to generate coding block data for an image.

16. The non-transitory computer-readable medium of claim 15, wherein the instructions to process the raw syntax element data comprise instructions to inverse binarize the raw syntax element data to generate the coding block data.

17. The non-transitory computer-readable medium of claim 15, wherein the instructions to process the raw syntax element data comprise instructions to:
parse the raw syntax element data; and
inverse binarize the parsed raw syntax element data to generate the coding block data.

18. The non-transitory computer-readable medium of claim 15, wherein the instructions are executable by the one or more processors for further causing the one or more processors to parse the bit stream based on the raw syntax element data.

19. The non-transitory computer-readable medium of claim 15, wherein the instructions to inverse binarize the bin sequences comprise instructions to exponential Golomb decode at least one of the bin sequences to produce a syntax element in the raw syntax element data.

20. The non-transitory computer-readable medium of claim 15, wherein the instructions are executable by the one or more processors for further causing the one or more processors to encode the raw syntax element data before storing the raw syntax element data to the memory.

* * * * *